US009391463B2

(12) United States Patent  (10) Patent No.: US 9,391,463 B2
Jung  (45) Date of Patent: Jul. 12, 2016

(54) DEVICE AND METHOD FOR WIRELESSLY TRANSMITTING POWER

(71) Applicant: HANRIM POSTECH CO., LTD., Suwon-si, Gyeonggi-do (KR)

(72) Inventor: Chun-Kil Jung, Seoul (KR)

(73) Assignee: HANRIM POSTECH CO., LTD., Suwon-Si (KR)

( * ) Notice: Subject to any disclaimer, the term of this patent is extended or adjusted under 35 U.S.C. 154(b) by 137 days.

(21) Appl. No.: 14/367,891

(22) PCT Filed: Dec. 21, 2012

(86) PCT No.: PCT/KR2012/011323
§ 371 (c)(1),
(2) Date: Jun. 20, 2014

(87) PCT Pub. No.: WO2013/095067
PCT Pub. Date: Jun. 27, 2013

(65) Prior Publication Data
US 2015/0022147 A1    Jan. 22, 2015

Related U.S. Application Data

(60) Provisional application No. 61/579,212, filed on Dec. 22, 2011.

(51) Int. Cl.
*H02J 7/00* (2006.01)
*H02J 5/00* (2016.01)
(Continued)

(52) U.S. Cl.
CPC ............... *H02J 5/005* (2013.01); *H01F 38/14* (2013.01); *H02J 7/025* (2013.01)

(58) Field of Classification Search
CPC ............ H01F 38/14; H02J 5/005; H02J 7/025
USPC ......................................................... 320/108
See application file for complete search history.

(56) References Cited

U.S. PATENT DOCUMENTS

2012/0169139 A1* 7/2012 Kudo .................. H02J 17/00
307/104

FOREIGN PATENT DOCUMENTS

JP    2000-294438 A    10/2000
JP    2008-172872 A    7/2008
(Continued)

OTHER PUBLICATIONS

International Search Report dated Apr. 22, 2013, Issued in Corresponding International Application No. PCT/KR2012/011323.
(Continued)

*Primary Examiner* — Vuthe Siek
(74) *Attorney, Agent, or Firm* — Stein IP, LLC (57) ABSTRACT

There are provided a device and a method for wirelessly transmitting a power in which a power is wirelessly transmitted to a power receiving device with high transmission efficiency. The wireless power transmitting device includes a first power transmitting coil configured to transmit a first power signal, a second power transmitting coil that is concentrically layered with the first power transmitting coil to transmit a second power signal, and a power supply unit configured to supply alternating current powers to the first power transmitting coil and the second power transmitting coil so as to allow the first power signal and the second power signal to have a phase difference of 180°.

18 Claims, 3 Drawing Sheets

(51) Int. Cl.
  *H01F 38/14* (2006.01)
  *H02J 7/02* (2016.01)

(56) References Cited

FOREIGN PATENT DOCUMENTS

| KR | 20-0361755 Y1 | 9/2004 |
| KR | 10-2008-0012782 A | 2/2008 |
| KR | 10-2010-0130985 A | 12/2010 |

OTHER PUBLICATIONS

International Search Report mailed Apr. 22, 2013, Issued in Corresponding International Application No. PCT/KR2012/011323.

* cited by examiner

DEVICE AND METHOD FOR WIRELESSLY TRANSMITTING POWER

CROSS-REFERENCE TO RELATED APPLICATIONS

This application is a national stage of International Application No. PCT/KR2012/011323, filed Dec. 21, 2012, which claims priority to U.S. Provisional Application No. 61/579,212, filed Dec. 22, 2011. All disclosures of the documents named above are incorporated herein by reference.

BACKGROUND OF THE INVENTION

1. Field of the Invention

The present invention relates to a device and a method for wirelessly transmitting a power in which a power is wirelessly transmitted to a power receiving device.

2. Description of the Related Art

In general, a power receiving device for supplying an operating power is attached to various mobile terminals such as a cellular phone or a PDA (Personal Digital Assistant).

The power receiving device receives a power supplied from an external charging device, and supplies the received power to the mobile terminal as the operating power.

The power receiving device may include a battery cell module that is charged with the power, and a charging/discharging circuit that receives the power supplied from the external charging device to charge the battery cell module with the power, and that discharges the power charged in the battery cell module to supply the discharged power to the mobile terminal as the operating power.

As a method for electrically connecting the charging device with the power receiving device, a terminal connecting method, which directly connects a terminal of the charging device from which the power is output to a terminal of the power receiving device to which the power is input through a cable and a connector, is widely known.

The terminal of the charging device from which the power is output and the terminal of the power receiving device to which the power is input have different potentials from each other.

Accordingly, when the terminal of the charging device from which the power is output and the terminal of the power receiving device to which the power is input are connected to each other or are separated from each other, instantaneous discharging may be caused due to a potential difference.

The instantaneous discharging causes abrasion in the terminal of the charging device and the terminal of the power receiving device. Further, when foreign substances are present in the terminal of the charging device or the terminal of the power receiving device, heat is generated in the foreign substances due to the instantaneous discharging, so that there is a concern that a negligent accident such as fire may occur.

Furthermore, the power charged in the battery cell module of the power receiving device is naturally discharged to the outside through the terminal of the power receiving device due to moisture, so that a lifespan of the power receiving device may be shortened, and performance thereof may be degraded.

In recent years, in order to solve various problems of the terminal connecting method, a wireless power transmitting device that wirelessly transmits the power to the power receiving device has been proposed.

The wireless power transmitting device wirelessly transmits the power by using, for example, an electromagnetic induction method. The power receiving device receives the power that is wirelessly transmitted from the wireless power transmitting device, and charges the battery cell module with the received power.

Much research and development has gone into allowing the wireless power transmitting device to stably transmit the power with high efficiency in a wireless manner and allowing the power receiving device to receive the power transmitted from the wireless power transmitting device to charge the battery cell module with the power.

SUMMARY OF THE INVENTION

Technical Problem

An object of the present invention is to provide a device and a method for wirelessly transmitting a power in which a power is wirelessly transmitted to a power receiving device with high transmission efficiency.

The objects of the present invention are not limited to the aforementioned technical object, and other technical objects that are not mentioned should be clearly understood by those skilled in the art from the following description.

Technical Solution

An exemplary embodiment of the present invention provides a wireless power transmitting device including a first power transmitting coil configured to transmit a first power signal; a second power transmitting coil configured to transmit a second power signal, the second power transmitting coil being concentrically layered with the first power transmitting coil; and a power supply unit configured to supply alternating current powers to the first power transmitting coil and the second power transmitting coil so as to allow the first power signal and the second power signal to have a phase difference of 180°.

The first and second power transmitting coils may have the same size and the same winding number, and may be wound in an opposite direction to each other. The power supply unit may include a power transmitting controller configured to generate a single PWM (Pulse Width Modulation) control signal; and a series resonance converter configured to generate the alternating current powers in response to the single PWM control signal, and configured to apply the generated alternating current powers to the first and second power transmitting coils to cause the first power signal and a second power signal to have a phase difference of 180°.

The wireless power transmitting device may further include a driving driver that is provided between the power transmitting controller and the series resonance converter, and that is configured to amplify the PWM control signal to output the amplified PWM control signal to the series resonance converter.

The power supply unit may further include a signal detecting unit configured to receive a charging status signal transmitted from the power receiving device through the first and second power transmitting coils to output the received charging status signal to the power transmitting controller, and the power transmitting controller may be configured to adjust the amount of the power transmitted to the power receiving device from the first and second power transmitting coils when the charging status signal includes overheating information.

The power transmitting controller may be configured to adjust a frequency of the PWM control signal to adjust the amount of the power transmitted to the power receiving device.

The power supply unit may further include a signal detecting unit configured to receive a charging status signal transmitted from the power receiving device through the first and second power transmitting coils to output the received charging status signal to the power transmitting controller, and the power transmitting controller may be configured to determine whether or not power charging of the power receiving device is completed by using the charging status signal, and stop the power transmission when the power charging is completed.

The first and second power transmitting coils may have the same size and the same winding number, and be wound in the same winding direction. The power supply unit may include a power transmitting controller configured to generate two PWM (Pulse Width Modulation) control signals having the same frequency and a phase difference of 180°; and first and second resonance converters configured to respectively generate alternating current powers having the same frequency and a phase difference of 180° in response to the two PWM control signals to apply the generated alternating current powers to the first and second power transmitting coils.

The wireless power transmitting device may further include a driving driver that is provided between the power transmitting controller and the first and second series resonance converters, and that is configured to amplify the two PWM control signals to output the amplified PWM control signals to the first and second series resonance converters.

The power supply unit further may include a signal detecting unit configured to receive a charging status signal transmitted from the power receiving device through the first and second power transmitting coils to output the received charging status signal to the power transmitting controller, and the power transmitting controller may be configured to adjust the amount of the power transmitted to the power receiving device from the first and second power transmitting coils when the charging status signal includes overheating information.

The power transmitting controller may be configured to adjust frequencies or phases of the PWM control signals to adjust the amount of the power.

The power supply unit may further include a signal detecting unit configured to receive the charging status signal transmitted from the power receiving device through the first and second power transmitting coils to output the received charging status signal to the power transmitting controller, and the power transmitting controller may be configured to determine whether or not the power charging of the power receiving device is completed by using the charging status signal, and to stop the power transmission when the power charging is completed.

The first and second power transmitting coils may have the same size and the same winding number, and be wound in an opposite direction. The power supply unit may include a power transmitting controller configured to generate two PWM (Pulse Width Modulation) control signals having the same frequency and phase; and first and second series resonance converters configured to respectively generate alternating current powers having the same frequency and phase in response to the two PWM control signals to apply the generated alternating current powers to the first and second power transmitting coils.

The power supply unit may further include a signal detecting unit configured to receive a charging status signal transmitted from the power receiving device through the first and second power transmitting coils to output the received charging status signal to the power transmitting controller, and the power transmitting controller may be configured to adjust the amount of the power transmitted to the power receiving device from the first and second power transmitting coils when the charging status signal includes overheating information.

The power transmitting controller may be configured to adjust frequencies or phases of the PWM control signals to adjust the amount of the power.

Another exemplary embodiment of the present invention provides a method for wirelessly transmitting a power including determining, by a power transmitting controller, whether or not a power is wirelessly transmitted to a power receiving device; generating, by the power transmitting controller, a PWM control signal for power transmission when the power is wirelessly transmitted to the power receiving device; and generating, by first and second transmitting coils that are layered, first and second power signals having a phase difference of 180° from each other in response to the PWM control signal, in order to wirelessly transmit the power to the power receiving device.

The operation of generating first and second power signals having a phase difference of 180° from each other by the first and second transmitting coils in response to the PWM control signal in order to wirelessly transmit the power to the power receiving device may include applying alternating current powers having the same phase to the first and second power transmitting coils, which have the same size and the same winding number, and which are wound in an opposite direction, to generate first and second signals having a phase difference of 180°.

The operation of generating first and second power signals having a phase difference of 180° from each other by the first and second transmitting coils in response to the PWM control signal in order to wirelessly transmit the power to the power receiving device may include applying alternating current powers having the same phase to the first and second power transmitting coils, which have the same size and the same winding number, and which are wound in the same winding direction, to generate first and second signals having a phase difference of 180°.

The method may further include receiving, by the power transmitting controller, a charging status signal transmitted from the power receiving device; and adjusting, by the power, transmitting controller, the amount of the power transmitted from the first and second power transmitting coils to the power receiving device when the charging status signal includes overheating information.

The operation of adjusting, by the power transmitting controller, the amount of the power transmitted from the first and second power transmitting coils to the power receiving device when the charging status signal includes overheating information may include adjusting, by the power transmitting controller, a frequency of the PWM control signal to adjust the amount of the power which is wirelessly transmitted to the power receiving device.

The operation of adjusting, by the power transmitting controller, the amount of the power transmitted from the first and second power transmitting coils to the power receiving device when the charging status signal includes overheating information may include adjusting phases of the first and second power signals generated by the first and second power transmitting coils to adjust the amount of the power which is wirelessly transmitted to the power receiving device.

Advantageous Effects

According to a device and a method for wirelessly transmitting a power of the present invention, a first power transmitting coil and a second power transmitting coil have the same size and the same winding number, and are concentrically layered to generate a first power signal and a second power signal which have a phase difference of 180° from each other to wirelessly transmit the power to a power receiving device.

Accordingly, as compared to a device or method where only a single power transmitting coil is used or a plurality of power transmitting coils (two or more coils) is used, in the present invention, a total amplitude of the first power signal and the second power signal which are respectively generated by the first power transmitting coil and the second power transmitting coil is increased more than about two times, so that the amount of the power which is wirelessly transmitted to the power receiving device is increased about four times.

BRIEF DESCRIPTION OF THE DRAWINGS

Hereinafter, the present invention will be described in more detail, in connection with embodiments that do not limit the present invention, with reference to the accompanying drawings, and the same part will be assigned the same reference numeral in the drawings.

DETAILED DESCRIPTION OF THE EMBODIMENTS

The following detailed description is merely an example, and is merely illustrative of embodiments of the present invention. Further, the principle and concept of the present invention are provided for the purpose of the most useful and easy description.

Therefore, it is appreciated that detailed structures unnecessary to understand the essential features of the present invention have not been provided, and various embodiments that are implemented by those skilled in the art in the substance of the present invention are exemplified through the drawings.

Figure 1:
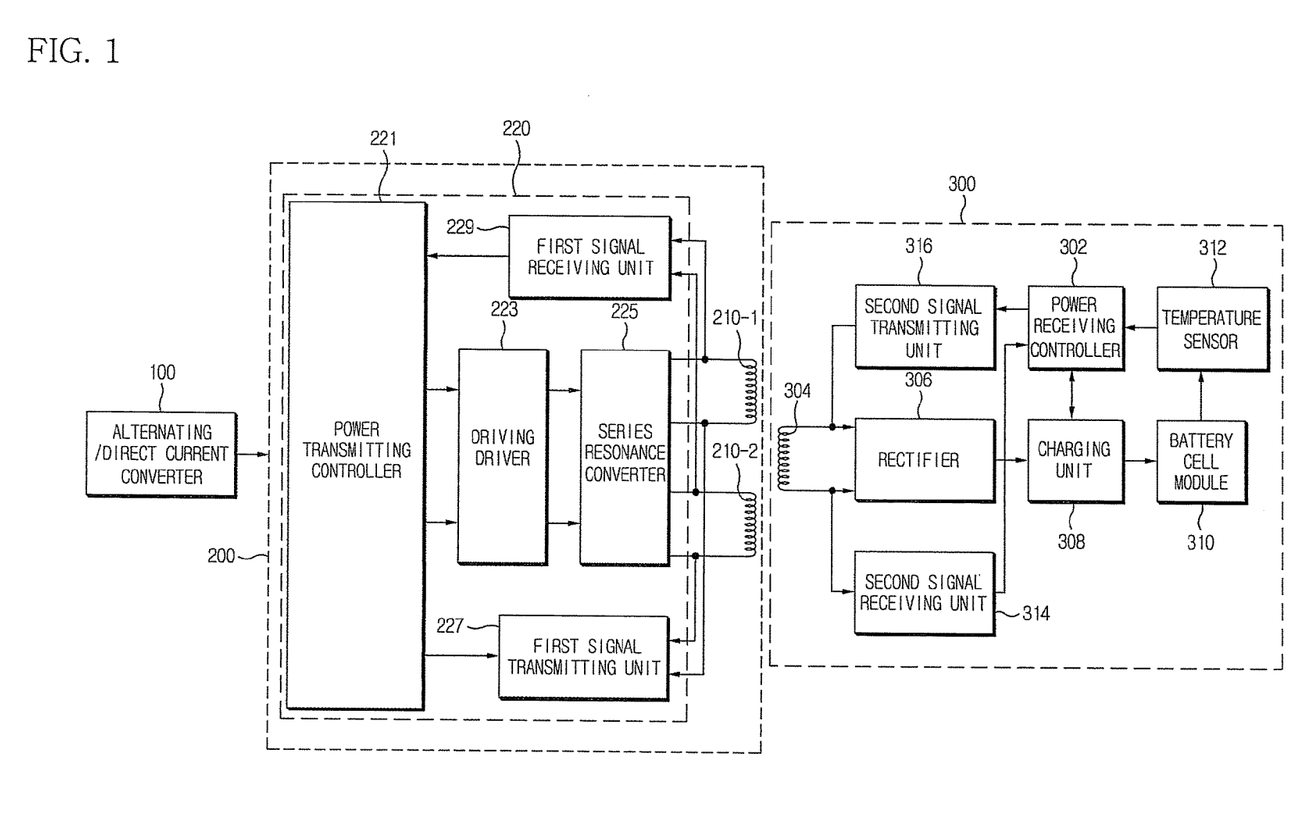
FIG. 1 is a block diagram showing a configuration of one embodiment of a wireless power transmitting system provided with a wireless power transmitting system of the present invention.

FIG. 1 is a block diagram showing a configuration of one embodiment of a wireless power transmitting system provided with a wireless power transmitting device of the present invention. Here, reference numeral 100 denotes an alternating/direct current converter. The alternating/direct current converter 100 converts an alternating current power input from the outside into a direct current power, and supplies the converted direct current power as an operating power.

Reference numeral 200 denotes a wireless power transmitting device according to the present invention. The wireless power transmitting device 200 is operated by the direct current power supplied from the alternating/direct current converter 100. Further, the wireless power transmitting device 200 switches the direct current power supplied from the alternating/direct current converter 100 to generate the alternating current power, and wirelessly transmits the generated alternating current power by using, for example, an electromagnetic induction method.

Here, although it has been described that the alternating/direct current converter 100 and the wireless power transmitting device 200 are separately provided, the alternating/direct current converter 100 may be integrally provided as part of the wireless power transmitting device 200 in implementing the present invention.

Reference numeral 300 denotes a power receiving device. The power receiving device 300 receives the power that is wirelessly transmitted from the wireless power transmitting device 200 to charge the power, and supplies the charged power to a mobile device as the operating power. Further, the power receiving device 300 transmits a unique ID signal stored in advance to the wireless power transmitting device 200 according to the request of the wireless power transmitting device 200. Furthermore, when the power is charged, the power receiving device 300 generates a power amount signal indicating the charging amount of the power and a charging status signal including overheating information informing of an overheating condition, and transmits the generated charging status signal to the wireless power transmitting device 200.

The wireless power transmitting device 200 may include a first power transmitting coil 210-1 that transmits a first power signal; a second power transmitting coil 210-2 that has the same size and the winding number as those of the first power transmitting coil 210-1, is wound in an opposite direction to a winding direction of the first power transmitting coil 210-1, and is concentrically layered with the first transmitting coil to transmit a second power signal; and a power supply unit 220 that supplies alternating current powers, having the same phase, to the first power transmitting coil 210-1 and the second power transmitting coil 210-2 so as to allow the first power signal and the second power signal to have a phase difference of 180°.

The power supply unit 220 may include a power transmitting controller 221, a driving driver 223, a series resonance converter 225, a first signal transmitting unit 227, and a first signal receiving unit 229.

The power transmitting controller 221 requests an ID signal from the power receiving device 300, and generates a control signal when the ID signal is received from the power receiving device 300 to control such that the power is wirelessly transmitted to the power receiving device 300. For example, the power transmitting controller 221 generates a PWM (Pulse Width Modulation) control signal to control such that the power is wirelessly transmitted to the power receiving device 300. Further, the power transmitting controller 221 determines whether or not the power receiving device 300 is overheated, and adjusts a frequency and phase of the PWM control signal to control such that the amount of the power that is wirelessly transmitted to the power receiving device 300 is adjusted when it is determined that the power receiving device is overheated.

The driving driver 223 amplifies the PWM control signal generated by the power transmitting controller 221.

The series resonance converter 225 switches the direct current power supplied from the alternating/direct current converter 100 to generate the alternating current powers in response to the PWM control signal amplified by the driving driver 223, and outputs the generated alternating current powers to the first and second power transmitting coils 210.

The first signal transmitting unit 227 generates an ID request signal for requesting an ID of the power receiving device 300 under the control of the power transmitting controller 221 to transmit the generated ID request signal to the power receiving device 300 through the first and second power transmitting coils 210-1 and 210-2.

The first signal receiving unit 229 receives an ID signal and a charging status signal transmitted from the power receiving device 300 through the first and second power transmitting coils 210-1 and 210-2 to output the received ID signal and charging status signal to the power transmitting controller 221.

The power receiving device 300 may include a power receiving controller 302, a power receiving coil 304, a rectifier 306, a charging unit 308, a battery cell module 310, a temperature sensor 312, a second signal receiving unit 314, and the second signal transmitting unit 316.

The power receiving controller 302 controls such that the power that is wirelessly transmitted from the wireless power transmitting device 200 is received and charged. Moreover, when the ID request signal is received, the power receiving controller 302 controls such that the ID signal is transmitted to the wireless power transmitting device 200. Further, the power receiving controller 302 controls such that the power amount signal for informing of the power charging amount of the battery cell module 310 and the charging status signal including the overheating information of the battery cell module 310 are transmitted to the wireless power transmitting device 200.

The power receiving coil 304 receives the power that is wirelessly transmitted from the wireless power transmitting device 200.

The rectifier 306 converts the power received by the power receiving coil 304 into the direct current power.

The charging unit 308 charges the battery cell module 310 with the direct current power converted by the rectifier 306 under the control of the power receiving controller 302.

The temperature sensor 312 detects a temperature of the battery cell module 310 to output the detected temperature to the power receiving controller 302.

The second signal receiving unit 314 receives the ID request signal transmitted from the wireless transmitting device 200 through the power receiving coil 304 and outputs the received ID request signal to the power receiving controller 302.

The second signal transmitting unit 316 transmits the ID signal and the charging information signal to the wireless power transmitting device 200 through the power receiving coil 304 under the control of the power receiving controller 302.

According to the present invention having the aforementioned configuration, the alternating/direct current converter 100 converts the alternating current power input from the outside into the direct current power, and supplies the converted direct current power to the wireless power transmitting device 200 as the operating power.

In such a state, the wireless power transmitting device 200 needs to determine whether or not a load—for example, the power receiving coil 304 of the power receiving device 300—is placed on the first and second power transmitting coils 210-1 and 210-2.

To achieve this, the power transmitting controller 221 of the power supply unit 220 generates a control signal for detecting a change of the load.

The control signal for detecting the change of the load is amplified by the driving driver 223, and is input to the series resonance converter 225.

The series resonance converter 225 switches the direct current power output from the alternating/direct current converter 100 to generate the alternating current powers in response to the control signal, and the generated alternating current powers are applied to the first and second power transmitting coils 210-1 and 210-2.

Here, the control signal for detecting the change of the load has a high frequency of, for example, about 180 kHz which does not cause resonance in the first and second power transmitting coils 210-1 and 210-2.

Accordingly, even though the series resonance converter 225 switches the direct current power to generate the alternating current powers in response to the control signal for detecting the change of the load, and the generated alternating current powers are applied to the first and second power transmitting coils 210-1 and 210-2, since the first and second power transmitting coils 210-1 and 210-2 do not cause the resonance, power consumption is very low, and the power is not wirelessly transmitted.

In this state, the first signal receiving unit 229 receives the signals of the first and second power transmitting coils 210-1 and 210-2, and output the received signals to the power transmitting controller 221.

The power transmitting controller 221 determines whether or not the load is changed by using frequencies of the received signals input from the first signal receiving unit 229.

That is, when the load is not placed on the first and second power transmitting coils 210-1 and 210-2, frequencies of the alternating current powers applied to the first and second power transmitting coils 210-1 and 210-2 are not changed.

However, when the load is placed on the first and second power transmitting coils 210-1 and 210-2, a mutual impedance is generated between the first and second power transmitting coils 210-1 and 210-2 and the power receiving coil 304 of the power receiving device 300, and the frequencies of the alternating current powers applied to the first and second power transmitting coils 210-1 and 210-2 are changed by the generated mutual impedance.

The power transmitting controller 221 determines whether or not the frequencies of the signals input from the first signal receiving unit 229 are changed, and when the frequencies are changed, it is determined that the load such as the power receiving device 300 is placed on the first and second power transmitting coils 210-1 and 210-2.

In this state, the power transmitting controller 221 needs to determine whether or not the load is the power receiving device 300.

To achieve this, the power transmitting controller 221 controls the first signal transmitting unit 227 to generate the ID request signal for requesting the ID signal of the power receiving device 300, and the generated ID request signal is transmitted to the power receiving device 300 through the first and second power transmitting coils 210-1 and 210-2.

The transmitted ID request signal is received by the second signal receiving unit 314 through the power receiving coil 304, and the received ID request signal is input to the power receiving controller 302.

The power receiving controller 302 controls the second signal transmitting unit 316 to generate the unique ID signal of the power receiving controller in response to the ID request signal, and the generated ID signal is transmitted to the wireless power transmitting device 200 through the power receiving coil 304.

In the wireless power transmitting device 200, the ID signal transmitted from the power receiving device 300 is received by the first signal receiving unit 229 through the first and second power transmitting coils 210-1 and 210-2, and is input to the power transmitting controller 221.

The power transmitting controller 211 determines that the power receiving device 300 other than a foreign substance is placed on the first and second power transmitting coils 210-1 and 210-2 by using the ID signal input from the first signal receiving unit 229.

When it is determined that the power receiving device 300 is placed on the first and second power transmitting coils 210-1 and 210-2, the power transmitting controller 211 generates the control signal for wirelessly transmitting the power: that is, the PWM control signal. The generated PWM control signal is amplified by the driving driver 223, and is input to the series resonance converter 225.

The series resonance converter 225 switches the direct current power to generate the alternating current power in response to the PWM control signal, and the generated alternating current power is applied to the first and second power transmitting coils 210-1 and 210-2.

Here, the first and second power transmitting coils 210-1 and 210-2 are designed to cause the resonance in a frequency of, for example, 100 kHz, and the power transmitting controller 221 generates the PWM control signal having a frequency of 100 kHz.

The series resonance converter 225 switches the direct current power to generate the alternating current powers having a frequency of 100 kHz in response to the PWM control signal, and since the generated alternating current powers having the frequency of 100 kHz are applied to the first and second power transmitting coils 210-1 and 210-2, the resonance occurs in the first and second power transmitting coils 210-1 and 210-2.

When the resonance occurs in the first and second power transmitting coils 210-1 and 210-2, a large amount of current flows in the first and second power transmitting coils 210-1 and 210-2 to wirelessly transmit the power.

Here, the series resonance converter 225 applies the alternating current powers having the same phase to the first and second power transmitting coils 210-1 and 210-2. However, since the first and second power transmitting coils 210-1 and 210-2 have the same size and the same winding number, are wound in the opposite direction to each other, and are concentrically layered, the first and second power transmitting coils 210-1 and 210-2 respectively generate the first and second power signals having a phase difference of 180° from each other.

Accordingly, as compared to a case where only a single power transmitting coil or a plurality of power transmitting coils (for example, two or more coils) is used, a total amplitude of the first and second power signals is increased more than two times. Thus, the amount of the power that is wirelessly transmitted to the power receiving device 300 is increased about four times.

The powers that are wirelessly transmitted from the first and second power transmitting coils 210-1 and 210-2 are received by the power receiving coil 304 of the power receiving device 300, and the received powers are converted into the direct current powers by the rectifier 306. The charging unit 308 charges the battery cell module 310 with the converted direct current powers under the control of the power receiving controller 302.

In this state, the temperature sensor 312 detects the temperature of the battery cell module 310, and the power receiving controller 302 determines whether or not the battery cell module 310 is overheated by using the temperature detected by the temperature sensor 312.

In addition, the power receiving controller 302 determines a power charging status of the battery cell module 550 through the charging unit 308.

Furthermore, the power receiving controller 302 generates the overheating information informing of whether or not the battery cell module 310 is overheated and the charging status signal including the charging information of the battery cell module 550, and the generated charging status signal is transmitted to the wireless power transmitting device 200 through the second signal transmitting unit 316 and the power receiving coil 304.

The charging status signal transmitted by the power receiving device 300 is received by the first signal receiving unit 229 through the first and second power transmitting coils 210-1 and 210-2 of the wireless power transmitting device 200, and is output to the power transmitting controller 221.

The power transmitting controller 221 analyzes the charging status signal to determine whether or not the overheating occurs or the charging is completed.

As the determining result, when the battery cell module 312 of the power receiving device 300 is overheated, the power transmitting controller 221 adjusts the frequency of the PWM control signal.

As the frequency of the PWM control signal is adjusted, the alternating current powers applied to the first and second power transmitting coils 210-1 and 210-2 are slightly deviated from resonance points of the first and second power transmitting coils 210-1 and 210-2, so that amplitudes of the first power signal and the second power signal are reduced.

Accordingly, the amount of the powers received by the power receiving coil 304 is decreased, so that the amount of the powers charged in the battery cell module 310 is reduced to prevent the overheating.

Moreover, as the analyzing result of the charging status signal, when the power charging of the battery cell module 310 is completed, since the power transmitting controller 221 does not generate the PWM control signal, the powers are not allowed to be wirelessly transmitted to the power receiving coil 304 from the first and second power transmitting coils 210-1 and 210-2.

Figure 2:
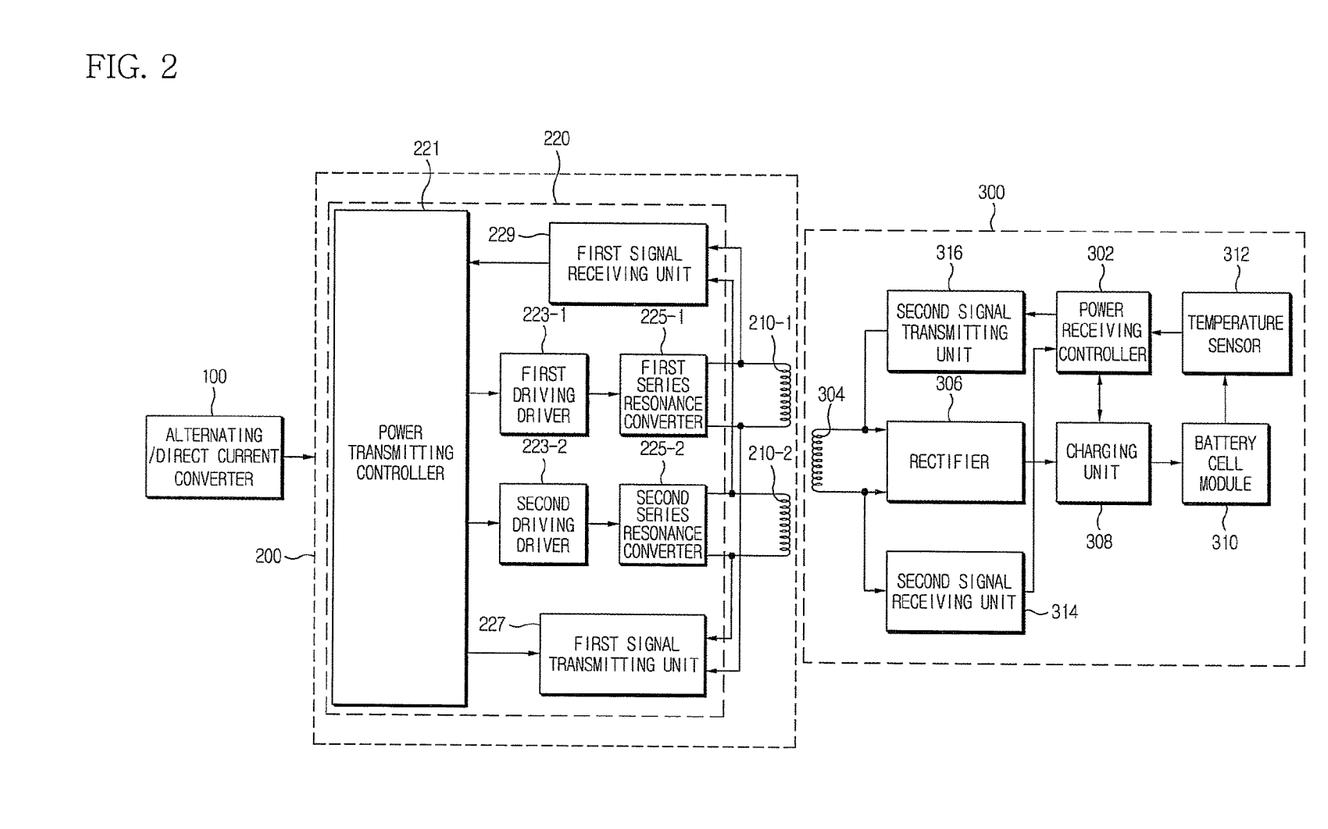
FIG. 2 is a block diagram showing a configuration of another embodiment of a wireless power transmitting system provided with a wireless power transmitting system of the present invention.

FIG. 2 is a block diagram showing a configuration of another embodiment of the wireless power transmitting system provided with the wireless power transmitting device of the present invention. In another embodiment of the present invention, the power transmitting controller 221 generates two PWM control signals.

The two PWM control signals generated by the power transmitting controller 221 are amplified by the first driving driver 223-1 and the second driving driver 223-2, and the first series resonance converter 225-1 and the second series resonance converter 225-2 generate the alternating current powers in response to the PWM control signals amplified by the first driving driver 223-1 and the second driving driver 223-2 to respectively apply the generated alternating current powers to the first and second power transmitting coils 210-1 and 210-2.

In addition, the first and second power transmitting coils 210-1 and 210-2 have the same size and the same winding number, are wound in the same winding direction, and are concentrically layered.

In the another embodiment of the present invention having the above-described configuration, when the power is transmitted to the power receiving device 300, the power transmitting controller 221 generates two PWM control signals having a phase difference of 180°.

The two PWM control signals having a phase difference of 180° are respectively amplified by the first and second driving drivers 223-1 and 223-2, and are input to the first and second series resonance converters 225-1 and 225-2.

The first and second series resonance converters 225-1 and 225-2 switch the direct current power by using the two PWM control signals having a phase difference of 180° to generate the alternating current powers having a phase difference of 180° from each other, and the generated alternating current powers are respectively applied to the first and second power transmitting coils 210-1 and 210-2.

Here, the first and second power transmitting coils 210-1 and 210-2 have the same size and the same winding number, are wound in the same winding direction, and are concentrically layered. Furthermore, the alternating current powers having a phase difference of 180° from each other are applied to the first and second power transmitting coils 210-1 and 210-2.

Accordingly, the first power signal generated by the first power transmitting coil 210-1 and the second power signal generated by the second power transmitting coil 210-2 have a phase difference 180° from each other. For this reason, since the total amplitude of the first and second power signals is increased more than two times, the amount of the power that is wirelessly transmitted to the power receiving device 300 is increased about four times.

In addition, in the another embodiment of the present invention, the first and second power transmitting coils 210-1 and 210-2 may have the same size and the same winding number, may be wound in an opposite direction to each other, and may be concentrically layered.

In this case, the power transmitting controller 221 generates two PWM control signals having the same phase and the same frequency, and alternating current powers having the same frequency and phase are applied to the first and second power transmitting coils 210-1 and 210-2 by the generated two PWM control signals to generate the first and second power signals having a phase difference of 180° from each other.

Further, in the another embodiment of the present invention, when the battery cell module 312 of the power receiving device 300 is overheated, the power transmitting controller 221 adjusts the frequencies of the PWM control signals or controls the phases of the two PWM control signals not to be 180°.

As the frequencies of the PWM control signals are adjusted, the alternating current powers applied to the first and second power transmitting coils 210-1 and 210-2 are slightly deviated from the resonance points of the first and second power transmitting coils 210-1 and 210-2, so that the amplitudes of the first power signal and the second power signal are reduced.

Furthermore, as the phases of the PWM control signals are adjusted, the phases of the first and second power signals generated by the first and second power transmitting coils 210-1 and 210-2 are not accurately 180°, so that the amount of the power received by the power receiving coil 304 is reduced. Accordingly, the amount of the power charged in the battery cell module 310 is reduced to prevent the overheating.

Figure 3:
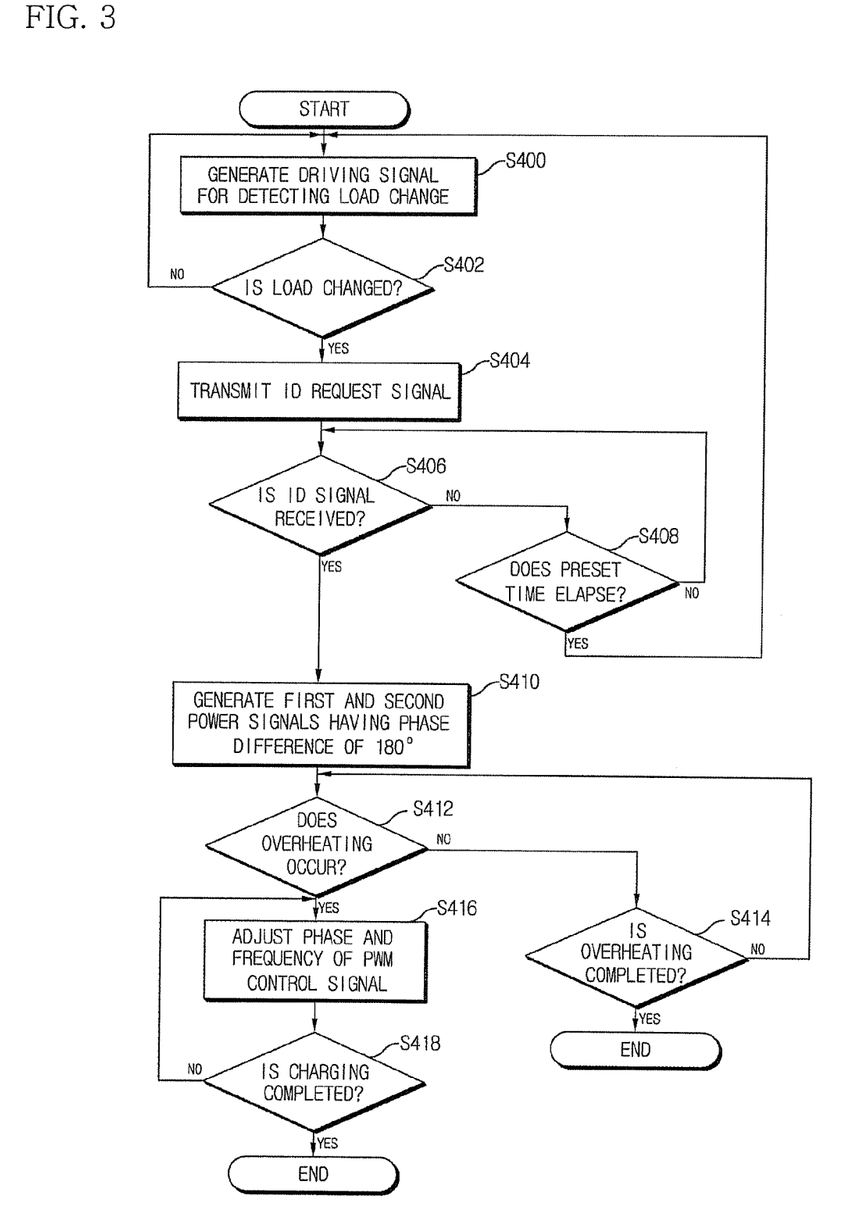
FIG. 3 is a signal flowchart showing an operation according to a method for wirelessly transmitting a power of the present invention.

FIG. 3 is a signal flowchart showing an operation of the power transmitting controller 221 according to a method for wirelessly transmitting a power of the present invention. Referring to FIG. 2, the power transmitting controller 221 generates the control signals for detecting the change of the load (S400).

The control signals are respectively amplified by the first and second driving drivers 223-1 and 223-2, and are input to the first and second series resonance converters 225-1 and 225-2. The first and second series resonance converters 225-1 and 225-2 switch the direct current power output from the alternating/direct current converter 100 to generate the alternating current powers in response to the control signals, and the generated alternating current powers are applied to the first and second power transmitting coils 210-1 and 210-2.

In this state, the first signal receiving unit 229 receives the signals of the first and second power transmitting coils 210-1 and 210-2, and the received signals are output to the power transmitting controller 221.

The power transmitting controller 221 detects the frequencies of the signals input from the first signal receiving unit 229 to determine whether or not the load is changed (S402).

As the determining result, when the load is not changed, the power transmitting controller 221 is returned to the operation S400 to repeatedly perform the operation of generating the control signals for detecting the change of the load and detecting the frequencies of the signals received by the first signal receiving unit 229 to determine whether or not the load is changed.

When the change of the load is detected in the operation S402, the power transmitting controller 221 controls the first signal transmitting unit 227 to generate the ID request signal for requesting the ID signal of the power receiving device 300, and the generated ID request signal is transmitted to the power receiving device 300 through the first and second power transmitting coils 210-1 and 210-2 (S404).

In such a state, the power transmitting controller 221 receives the received signal of the first signal receiving unit 229 to determine whether or not the ID signal of the power receiving device 300 is received (S406).

As the determining result, when the ID signal is not received, the power transmitting controller 221 determines whether or not a preset time elapses (S408).

As the determining result, when the preset time does not elapse, the power transmitting controller is returned to the operation S406 to repeatedly perform the operation of determining whether or not the ID signal is received.

Furthermore, even though the preset time elapses, when the ID signal is not received, since a foreign substance other than the power receiving device 300 is placed on the first and second power transmitting coils 210-1 and 210-2, the power transmitting controller 221 is returned to the operation S400 to repeatedly perform the operation of generating the control signals for detecting the change of the load.

Moreover, when the ID signal is received before the preset time elapses, the power transmitting controller 221 controls the first and second power transmitting coils 210-1 and 210-2 to generate the first and second power signals having a phase difference of 180° from each other, so that the power is wirelessly transmitted to the power receiving device 300 (S410).

That is, as in the one embodiment shown in FIG. 1, the first power transmitting coil 210-1 and the second transmitting coil 210-2 have the same size and the same winding number, are wound in the opposite direction, and are concentrically layered, and the power transmitting controller 221 generates a single PWM control signal. The alternating current powers having the same phase are applied to the first power transmitting coil 210-1 and the second transmitting coil 210-2 in response to the generated a single PWM control signal, so that the first and second power signals having a phase difference of 180° from each other are generated.

In the another embodiment shown in FIG. 2, when the first power transmitting coil 210-1 and the second power transmitting coil 210-2 have the same size and the same winding number, are wound in the same winding direction, and are concentrically layered, the power transmitting controller 221 generates the two PWM control signals having the same frequency and a phase difference of 180°. The alternating current powers having a phase difference of 180° are applied to the first power transmitting coil 210-1 and the second power transmitting coil 210-2 in response to the generated two PWM control signals, so that the first and second power signals having a phase difference of 180° from each other are generated.

Further, in the another embodiment shown in FIG. 2, when the first power transmitting coil 210-1 and the second power transmitting coil 210-2 have the same size and the same winding number, are wound in the opposite direction, and are concentrically layered, the power transmitting controller 221 generates the two PWM control signals having the same frequency and phase. The alternating current powers having a phase difference of 180° are applied to the first power transmitting coil 210-1 and the second transmitting coil 210-2 by the generated two PWM control signals, so that the first and second power signals having a phase difference of 180° from each other are generated.

In this state, the power transmitting controller 221 receives the charging status signal transmitted from the power receiving device 300 through the first signal receiving unit 229, and analyzes the received charging status signal to determine whether or not the power receiving device 300 is overheated or the charging of the power is completed (S412 and S414).

As the determining result, when the battery cell module 312 of the power receiving device 300 is overheated, the power receiving controller 221 adjusts the frequencies or phases of the PWM control signals to reduce the amount of the power transmitted to the power receiving device 300 from the first and second power transmitting coils 210-1 and 210-2 (S416).

Further, the power transmitting controller 221 determines whether or not the power charging of the power receiving device 300 is completed (S418).

In such a state, when the power charging of the power receiving device 300 is completed, the power transmitting controller 221 ends the operation of transmitting the power to the power receiving device 300.

As described above, the present invention has been described in detail in connection with the representative embodiments, but it should be understood to those skilled in the art that the aforementioned embodiments can be modified in various manners without departing from the scope of the present invention.

Therefore, the scope of the present invention is not limited to the aforementioned embodiments, and should be decided by the appended claims and their equivalents.

The invention claimed is:

1. A wireless power transmitting device comprising:
   a first power transmitting coil configured to transmit a first power signal;
   a second power transmitting coil configured to transmit a second power signal, the second power transmitting coil being concentrically layered with the first power transmitting coil; and
   a power supply unit configured to supply alternating current powers to the first power transmitting coil and the second power transmitting coil so as to allow the first power signal and the second power signal to have a phase difference of 180°,
   wherein the first and second power transmitting coils have the same size and the same winding number, and are wound in an opposite direction to each other, and
   wherein the power supply unit includes:
      a power transmitting controller configured to generate a single PWM (Pulse Width Modulation) control signal; and
      a series resonance converter configured to generate the alternating current powers in response to the single PWM control signal, and configured to apply the generated alternating current powers to the first and second power transmitting coils to cause the first power signal and a second power signal to have a phase difference of 180°.

2. The wireless power transmitting device of claim 1, further comprising:
   a driving driver that is provided between the power transmitting controller and the series resonance converter, and that is configured to amplify the PWM control signal to output the amplified PWM control signal to the series resonance converter.

3. The wireless power transmitting device of claim 2, wherein the power supply unit further includes a signal detecting unit configured to receive a charging status signal transmitted from the power receiving device through the first and second power transmitting coils to output the received charging status signal to the power transmitting controller, and the power transmitting controller is configured to determine whether or not power charging of the power receiving device is completed by using the charging status signal, and stops the power transmission when the power charging is completed.

4. The wireless power transmitting device of claim 1, wherein the power supply unit further includes:
   a signal detecting unit configured to receive a charging status signal transmitted from the power receiving device through the first and second power transmitting coils to output the received charging status signal to the power transmitting controller, and
   the power transmitting controller is configured to adjust the amount of the power transmitted to the power receiving device from the first and second power transmitting coils when the charging status signal includes overheating information.

5. The wireless power transmitting device of claim 4, wherein the power transmitting controller is configured to adjust a frequency of the PWM control signal to adjust the amount of the power transmitted to the power receiving device.

6. The wireless power transmitting device of claim 1, wherein the first and second power transmitting coils have the same size and the same winding number, and are wound in the same winding direction, and
   the power supply unit includes:
      a power transmitting controller configured to generate two PWM (Pulse Width Modulation) control signals having the same frequency and a phase difference of 180°; and
      first and second resonance converters configured to respectively generate alternating current powers having the same frequency and a phase difference of 180° in response to the two PWM control signals to apply the generated alternating current powers to the first and second power transmitting coils.

7. The wireless power transmitting device of claim 6, further comprising:
   a driving driver that is provided between the power transmitting controller and the first and second series resonance converters, and that is configured to amplify the two PWM control signals to output the amplified PWM control signals to the first and second series resonance converters.

8. The wireless power transmitting device of claim 6, wherein the power supply unit further includes a signal detecting unit configured to receive a charging status signal transmitted from the power receiving device through the first and second power transmitting coils to output the received charging status signal to the power transmitting controller, and the power transmitting controller is configured to adjust the amount of the power transmitted to the power receiving device from the first and second power transmitting coils when the charging status signal includes overheating information.

9. The wireless power transmitting device of claim 8, wherein the power transmitting controller is configured to adjust frequencies or phases of the PWM control signals to adjust the amount of the power.

10. The wireless power transmitting device of claim 6, wherein the power supply unit further includes a signal detecting unit configured to receive the charging status signal transmitted from the power receiving device through the first and second power transmitting coils to output the received charging status signal to the power transmitting controller, and
the power transmitting controller is configured to determine whether or not the power charging of the power receiving device is completed by using the charging status signal, and stops the power transmission when the power charging is completed.

11. The wireless power transmitting device of claim 1, wherein the first and second power transmitting coils have the same size and the same winding number, and are wound in an opposite direction, and
the power supply unit includes:
a power transmitting controller configured to generate two PWM (Pulse Width Modulation) control signals having the same frequency and phase; and
first and second series resonance converters configured to respectively generate alternating current powers having the same frequency and phase in response to the two PWM control signals to apply the generated alternating current powers to the first and second power transmitting coils.

12. The wireless power transmitting device of claim 11, wherein the power supply unit further includes a signal detecting unit configured to receive a charging status signal transmitted from the power receiving device through the first and second power transmitting coils to output the received charging status signal to the power transmitting controller, and
the power transmitting controller is configured to adjust the amount of the power transmitted to the power receiving device from the first and second power transmitting coils when the charging status signal includes overheating information.

13. The wireless power transmitting device of claim 12, wherein the power transmitting controller is configured to adjust frequencies or phases of the PWM control signals to adjust the amount of the power.

14. A method for wirelessly transmitting a power comprising:
determining, by a power transmitting controller, whether or not a power is wirelessly transmitted to a power receiving device;
generating, by the power transmitting controller, a PWM control signal for power transmission when the power is wirelessly transmitted to the power receiving device; and
generating, by first and second transmitting coils that are layered, first and second power signals having a phase difference of 180° from each other in response to the PWM control signal to wirelessly transmit the power to the power receiving device,
wherein the step of generating first and second power signals having a phase difference of 180° from each other by the first and second transmitting coils in response to the PWM control signal to wirelessly transmit the power to the power receiving device, includes applying alternating current powers having the same phase to the first and second power transmitting coils, which have the same size and the same winding number, and are wound in an opposite direction, to generate first and second signals having a phase difference of 180°.

15. The method of claim 14, wherein the step of generating first and second power signals having a phase difference of 180° from each other by the first and second transmitting coils in response to the PWM control signal to wirelessly transmit the power to the power receiving device, includes applying alternating current powers having the same phase to the first and second power transmitting coils, which have the same size and the same winding number, and are wound in the same winding direction, to generate first and second signals having a phase difference of 180°.

16. The method of claim 14, further comprising:
receiving, by the power transmitting controller, a charging status signal transmitted from the power receiving device; and
adjusting, by the power transmitting controller, the amount of the power transmitted from the first and second power transmitting coils to the power receiving device when the charging status signal includes overheating information.

17. The method of claim 14, wherein the step of adjusting, by the power transmitting controller, the amount of the power transmitted from the first and second power transmitting coils to the power receiving device when the charging status signal, includes overheating information includes adjusting, by the power transmitting controller, a frequency of the PWM control signal to adjust the amount of the power which is wirelessly transmitted to the power receiving device.

18. The method of claim 17, wherein the step of adjusting, by the power transmitting controller, the amount of the power transmitted from the first and second power transmitting coils to the power receiving device when the charging status signal includes overheating information, includes adjusting phases of the first and second power signals generated by the first and second power transmitting coils to adjust the amount of the power which is wirelessly transmitted to the power receiving device.

* * * * *